United States Patent [19]

Hayashida

[11] 3,977,425
[45] Aug. 31, 1976

[54] HYDRAULIC PRESSURE CONTROL VALVE

[75] Inventor: Yoshihiro Hayashida, Chigasaki, Japan

[73] Assignee: Tokico Ltd., Kanagawa, Japan

[22] Filed: Dec. 20, 1974

[21] Appl. No.: 535,024

Related U.S. Application Data

[62] Division of Ser. No. 421,640, Dec. 4, 1973, abandoned.

[30] Foreign Application Priority Data

| Dec. 4, 1972 | Japan | 47-121300 |
| Feb. 6, 1973 | Japan | 48-14904 |
| Apr. 20, 1973 | Japan | 48-44872 |
| Apr. 20, 1973 | Japan | 48-44873 |

[52] U.S. Cl. ............ 137/116.3; 137/596.1; 137/627.5; 137/DIG. 4; 303/54
[51] Int. Cl.² .................................. F15B 13/14
[58] Field of Search ......... 137/DIG. 4, 116.3, 596.1, 137/627.5; 303/50, 52, 54

[56] References Cited
UNITED STATES PATENTS

| 537,819 | 4/1895 | Egan | 137/596.1 |
| 1,144,758 | 6/1915 | Desmond | 137/627.5 |
| 1,541,913 | 6/1925 | Bartholomew | 137/596.1 X |
| 2,470,746 | 5/1949 | Schultz | 303/54 |
| 2,812,218 | 11/1957 | Fitch et al. | 137/627.5 X |
| 3,532,395 | 10/1970 | Julow | 137/627.5 X |

*Primary Examiner*—Alan Cohan
*Assistant Examiner*—Gerald A. Michalsky
*Attorney, Agent, or Firm*—Wenderoth, Lind & Ponack

[57] ABSTRACT

A hydraulic pressure control valve has a piston slidably disposed in a bore of a housing and having a supplying pressure chamber therein which is communicated with a source of hydraulic pressure, an actuating pressure space defined in the bore for communicating with a pressure actuating means, the piston being exposed to the space at one side thereof and urged toward the space by a resilient means and having a supply opening for connecting said chamber with the space. A push rod is slidably disposed in the bore and operably connected to an operating means, a supply valve normally closing the supply opening and coaxially disposed in the piston. A normally open exhaust valve connects the actuating pressure space with a reservoir which supplies hydraulic fluid to the pressure source, the push rod being adapted to move toward the pressure space and the piston, when operated for closing the exhaust valve and further movement of the piston in the same direction, opening the supply valve.

1 Claim, 7 Drawing Figures

HYDRAULIC PRESSURE CONTROL VALVE

This is a division of application Ser. No. 421,640 filed Dec. 4, 1973, now abandoned.

BACKGROUND OF THE INVENTION

This invention relates to a hydraulic control valve. It is known in a hydraulic brake system for use in a vehicle to use a hydraulic control valve, whereby the hydraulic pressure fed from a high pressure supply source, such as a high pressure pump, accumulator or the like, is converted to a valve controlled in response to the operation of a brake pedal and then supplied to a wheel brake.

Although it is a principal object of the invention to provide a hydraulic control valve which is reliable in operation, simple in construction and well adapted to the aforesaid application, the hydraulic control valve according to the present invention finds a wide range of applications other than those for a hydraulic brake device for a vehicle.

SUMMARY OF THE INVENTION

It is an object of the invention to provide a hydraulic pressure control valve comprising a piston slidably disposed in a stepped bore of a housing and having a supplying pressure chamber therein which is communicated with a source of hydraulic pressure, an actuating pressure space defined in the bore for communicating with a pressure actuating means, said piston being exposed to said space at one side thereof and urged toward said space by a resilient means and having a supply opening for connecting said chamber with said space, a push rod slidably disposed in the bore and operably connected to an operating means, a supply valve normally closing said supply opening and coaxially disposed in the piston, a normally open exhaust valve for connecting said actuating pressure space with a reservoir which supplies hydraulic fluid to said pressure source, said push rod being adapted to move toward said pressure space and said piston, when operated for closing the exhaust valve and further movement of said piston in the same direction, opening the supply valve.

The resilient means as used herein should preferably have a relatively high spring constant, while the compression coil spring or hard rubber or the equivalent may be used for this application.

When the push rod is actuated, the exhaust valve will close and therefter the supply valve will open and hydraulic pressure in the actuating chamber will increase. The hydraulic pressure in the actuating chamber acts to retract the piston against the resiliency of the resilient means so as to close the supply valve. Thus, hydraulic pressure in the actuating pressure space corresponding to the operating force or to the extent or distance the push rod is moved will be established automatically.

Further, the hydraulic pressure in the actuating pressure space acts directly on the inner end of the push rod, and an optimum reaction or brake feeling is transmitted to an operator through the push rod.

The push rod may be so formed as to have a blind bore extending from the inner end thereof and communicating with the exhaust opening through a radial bore, and wherein the exhaust valve is formed of an axially extending stem of the supply valve and a valve seat formed at the inner end of said blind bore.

With such an arrangement, the hydraulic pressure in the actuating pressure space may be exerted directly on the inner end of the push rod, while a force corresponding to the aforesaid hydraulic pressure may be applied to the operating means, and thus an optimum operational feeling may be presented to an operator.

The piston may be so formed as to have a blind bore opposite the supply opening, and the bore is adapted to slidably receive the valve stem of said supply valve and to introduce hydraulic fluid of the actuating pressure therein.

This arrangement greatly aids in reducing the force required for opening and closing of the supply valve and obviates the need for an excessive force for opening the valve, particularly in case high hydraulic pressure from the high pressure supply source is present, whereby better operational feeling may be obtained.

According to another feature of the invention, the aforesaid supply valve is so formed as to have a stem slidably and sealingly disposed in said bore and having a longitudinal bore communicating with the actuating pressure space, said stem extending toward the push rod for defining the valve seat of the exhaust valve at the tip end thereof for cooperating with the inner end of the push rod which forms a valve member of the exhaust valve.

This arrangement makes it possible to minimize the area of the push rod, to which is applied the hydraulic pressure within the actuating pressure space, and to nullify hysteresis between the input of the push rod and the actuating pressure between the pressure reducing step and pressure increasing step, thereby achieving a smooth pressure releasing operation.

According to a further feature of the invention, a hollow plunger is slidably and sealingly disposed in the bore of the housing, one end of which is adapted to cooperate with the inner end of the push rod for defining said exhaust valve, and the other end of which is adapted to abut the stem of the supply valve for opening the supply valve.

By providing such an arrangement, it becomes possible that there is some hysteresis between the stroke of the push rod and the actuating pressure between the pressure increasing and decreasing steps, while nullifying hysteresis between the input of the push rod and the aforesaid pressure.

These and other objects and features of the present invention will be clear by reading the ensuing part of the specification with the reference to the accompanying drawings.

DETAILED DESCRIPTION OF THE EMBODIMENTS

Figure 1:
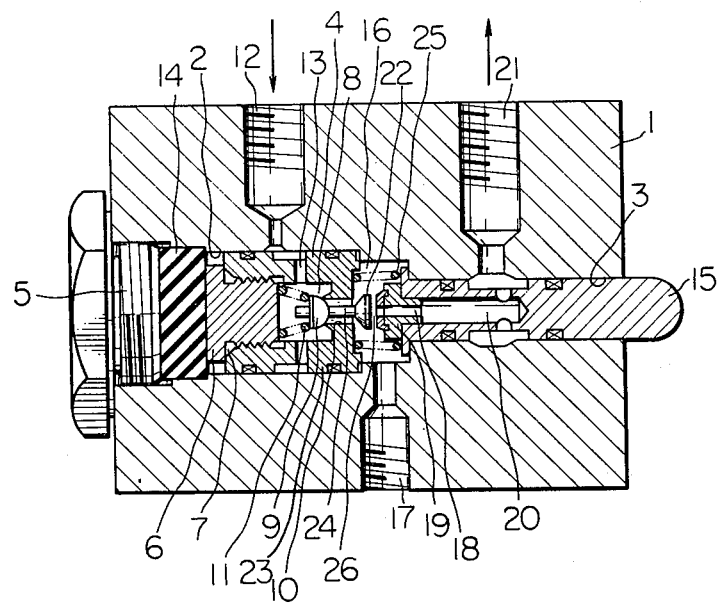
FIG. 1. is a longitudinal, cross-sectional view of the first embodiment of the invention.

Referring now to FIG. 1, there is shown a stepped bore extending through a valve body 1 of a hydraulic control valve, said bore having a large diameter portion 2 and a small diameter portion 3, the large diameter portion 2 having a piston 4 slidingly fitted therein and the left end of the large diameter portion being closed with a plug 5. The piston is shaped like a cup having one end open to the left, the left hand opening thereof is closed with a plug and a seal ring 7, thereby defining a pressure chamber 8 therein. Provided in the pressure chamber 8 is a supply valve 9 which is seated, under the spring action of a light spring 11, on a supply valve seat 10 formed in the pressure chamber 8 within the piston. The pressure chamber 8 opens to a source of pressure fluid, such as a high pressure pump, accumulator or the like, through a supply passage 12 in body 1 and then through a passage 13.

On the other hand, there is provided a resilient member 14 having a relatively high spring constant and which can be a rubber body or a compression spring, between the plug 6 threaded into the left hand opening of the piston 4 and the plug 5 threaded into the large diameter portion 2 of the stepped bore extending through the body 1.

Slidingly fitted in the small diameter portion 3 of the stepped bore in the body 1 is a push rod 15, while there is provided an actuating chamber 16 between the push rod 15 and the piston 4, said chamber 16 being in communication through a passage 17 with a pressure actuating means such as a brake cylinder or the like. Provided in the left end of the push rod 15 is an exhaust valve seat 19 having a coaxial through hole 18, said exhaust valve seat 19 being fitted integrally therein by a press-fit, while the hole 18 defines an exhaust hole jointly with the passage 20 and is in communication with the exhaust passage 21 in body 1. Provided within the actuating chamber 16 is an exhaust valve 22 adapted to seat on the exhaust valve seat 19, said exhaust valve 22 being integrally coupled to a supply valve 9 by means of a vlave stem 24 extending through a supply port 23 provided in the piston 4. Interposed between the push rod 15 and the piston 4 is a spring 25 which urges the push rod 15 and the piston 4 in a direction to separate one from the other to thereby provide a clearance 26 between the exhaust valve 22 and the exhaust valve seat 19, while communicating the actuating chamber 16 with the exhaust passage in its normal home position as shown in the drawing.

When the push rod is pushed to the left in the drawing, the exhaust valve seat 19 will come into contact with the exhaust valve 22 to thereby block the actuating chamber 16 from the exhaust passage 21. When the push rod 15 is further pushed to the left, the exhaust valve seat 19 will urge the exhaust valve 22 to the left, and the supply valve 9 integral with the exhaust valve 22 will be raised from the supply valve seat 10, and the actuating chamber 16 will be in communication with the pressure chamber 8.

It follows that the pressure fluid within the pressure chamber 8 flows into the actuating chamber 16 and is fed through the passage 17 to a brake cylinder or the like.

When the fluid pressure is applied to the actuating chamber 16, then the push rod 15 receives a reaction force of a magnitude determined by the effective pressure receiving area multiplied by fluid pressure in the actuating chamber, whereupon the piston 4 is shifted to the left, compressing the resilient member 14. Thus, due to the relative position of the push rod 15 to the piston 4, the supply valve seat 10 will come into contact with the supply valve 9, thereby blocking the communication of the pressure chamber 8 with the actuating chamber 16 to interrupt the introduction of the pressure fluid into the actuating chamber 16.

Under such a condition, the actuating chamber 16 is blocked both from the pressure chamber 8 and from the exhaust passage, whereby the fluid pressure corresponding to the stroke or the input force of the push rod 15 is produced within the actuating chamber 16.

Accordingly, even if the push rod 15 is pushed rapidly therein, the resultant rapid pressure rise will partially cause the resilient member 14 to be compressed by way of the piston 4, such that the rising rate of the reaction force against the push rod 15 may be reduced correspondingly thereto. In addition, since the push rod 15 is receiving the reaction force at all times, the pressure corresponding thereto will be supplied to the brake cylinder.

If the push rod 15 is pushed with a further greater force, the supply valve 9 will be raised from the supply valve seat 10 to bring the actuating chamber in communication with the pressure chamber 8 again, whereby the pressure fluid will flow from the pressure chamber 8 into the actuating chamber 16, and when the fluid pressure reaches a pressure corresponding to the urging force or the input of the push rod 15, then the supply valve seat 10 will come into contact with the supply valve 9, thus producing an equilibrium condition under a high pressure.

Conversely, when the urging force of the push rod is reduced, the high fluid pressure present within the actuating chamber 16 will cause the push rod 15 to be urged to the right, and thus the exhaust valve seat 19 will be separated from the exhaust valve to thereby bring the actuating chamber 16 into communication with the exhaust passage 20, whereby the pressure fluid within the actuating chamber 16 will be discharged into the exhaust passage 21, thus reducing the pressure. When the pressure is lowered down to a pressure corresponding to the urging force of the push rod 15, then the exhaust valve seat 19 will come into contact with the exhaust valve 22, thereby producing an equilibrium condition at a low pressure.

In this manner, the fluid pressure in proportion to the urging force of the push rod 15 may be maintained within the actuating chamber 16, and this very pressure is supplied from the passage 17 to the brake cylinder of the vehicle.

As is clear from the foregoing, since the resilient member 14 is provided on the opposite side of the actuating chamber of the piston 4, the piston 4, when in equilibrium, compresses the resilient member 14 and moves so as to bring the supply valve seat 10 into contact with the supply valve to thereby block the actuating chamber 16 from the pressure chamber 8, such that the push rod 15 will not be urged backward rapidly, thereby presenting better operational feeling.

Figure 4:
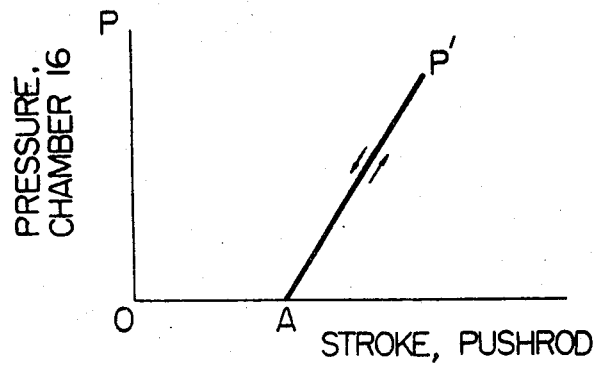
FIG. 4 is a diagram illustrating the relationship of the stroke of a push rod to the pressure.

In addition, since the supply pressure is continuously introduced into the interior of the piston 4, and since the supply valve 9 provided in the piston 4 and exhaust valve 22 are disposed coaxially and the opening and closing thereof are controlled by means of the push rod 15, the valve of this invention operates substantially without any lost-action in the stroke of the push rod (FIG. 4). Furthermore, under operational conditions, the supply valve 9 blocks the flow of the fluid, such that there is no excessive consumption of power. Still furthermore, since the portion of the push rod 15 extending through the valve body 1 is located on the lower pressure side, the sliding resistance in this portion may be minimized and, at the same time, an excessive urging force on the push rod 15 will not result.

Figure 2:
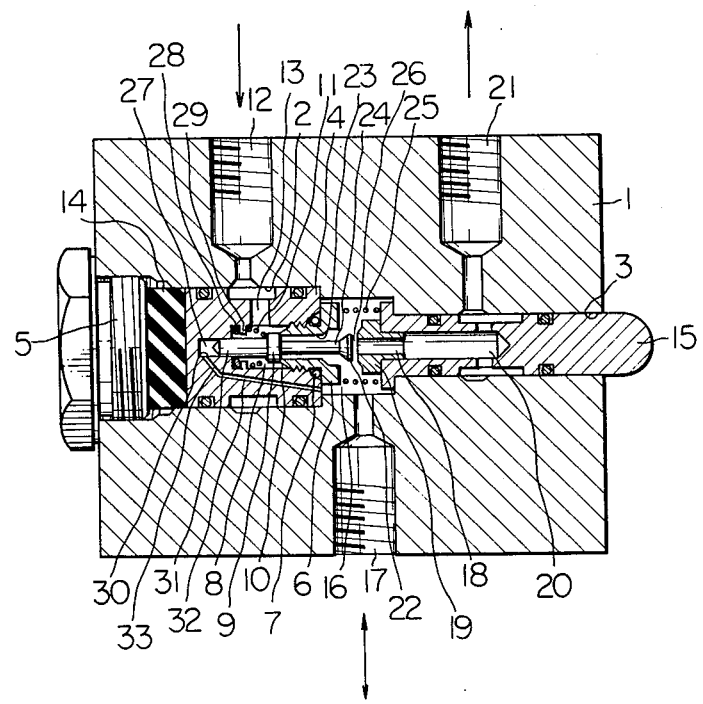
FIG. 2 is a view similar to that of FIG. 1, showing the second embodiment of the invention.

FIG. 2 shows the second embodiment of the present invention, with the same reference numerals being designated for the corresponding parts.

A piston 4 is open to the right, and this opening is closed with a plug 6 and O-ring 7. A supply port 23 and supply valve seat 10 are provided within the plug 6. Provided integrally with the supply valve 9 is a projecting portion 31 which is adapted to slidingly move within a blind hole 30 provided in such a portion of the piston 4 which defines the left hand end portion of the pressure chamber 8. Defined between the projecting portion 31 and the end wall of the hole 30 is a back pressure chamber 27 which is hydraulically sealed from the pressure chamber 8 by means of a seal 28, a retainer 29 and a spring 11. The back pressure chamber 27 is in communication with the actuating chamber 16 through passages 32 and 33 and so constructed as to maintain the same level of pressure as that in the actuating chamber 16. In place of the passages 32 and 33, there may be used through-passages in the valve stem 24 and projecting portion 31.

The operation of this valve is similar to that shown in FIG. 1. However, since there is provided a projecting portion 31 integral with the supply valve 9 in the extending relation across the pressure chamber 8 and slidingly and intimately fitted in the piston 4, while the pressure from the actuating chamber 16 is caused to act on the end surface thereof, the effect of the closing direction of the fluid pressure within the pressure chamber 8 on the supply valve 9 can be eliminated, thereby reducing the force on the push rod to open the valve, with the result that the pressure fluid may be readily introduced into the actuating chamber, even if the supply pressure is extremely high.

Figure 3:
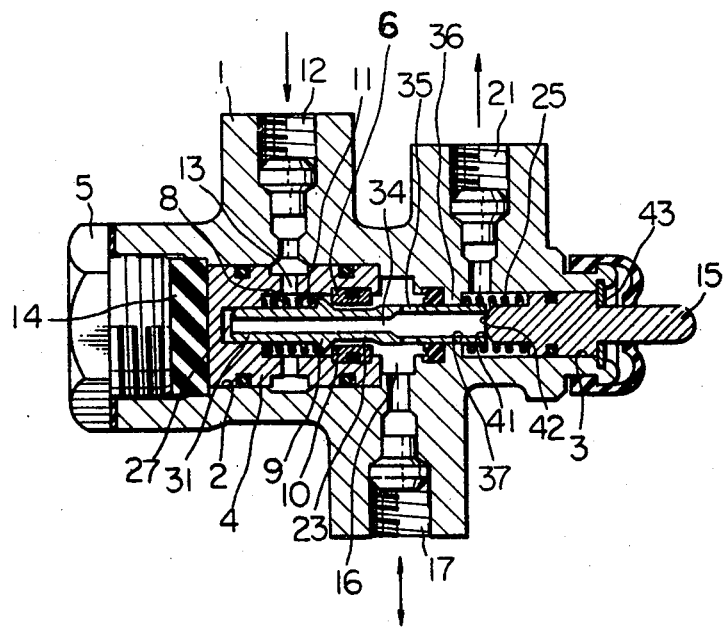
FIG. 3 is a longitudinal, cross-sectional view of the third embodiment of the invention.

FIG. 3 illustrates the third embodiment of the present invention in which there is no hysteresis in the input force of the push rod between the pressure increasing step and the pressure decreasing step. The control valve of a general type experiences such a hysteresis, such that the pressure decrease in the actuating chamber is delayed when the force applied to the push rod is decreased. For instance, in the case of a brake, the braking force will not be lowered, whereas in the case of the embodiment as shown, the relationship of the input of the push rod to the pressure in the actuating chamber will be as shown by the solid line in FIG. 5. The broken line however denotes the case with the control valve having hysteresis, i.e., the case as shown in FIG. 1. FIG. 4 represents the relationship of the push rod stroke to the pressure in the aforesaid respective embodiment.

The control valve shown in FIG. 3 is similar in construction to that shown in FIG. 2, and thus the corresponding parts are designated by the same reference numerals. The piston 4 is similar in construction to that shown in FIG. 2, except that the passage communicating the back pressure chamber 27 with the actuating chamber 16 to transmit the pressure from the actuating chamber 16 to the back pressure chamber 27 is defined by a longitudinal through-hole 34 and a radial through-hole 35 communicating the hole 34 with the chamber 16. Provided between the bore portion 3, through which the push rod is operated, and the actuating chamber 16 is a partition wall 36 and a bore portion 37 extending through said partition wall, and the valve stem of the supply valve 9 is adapted to move slidably through the bore portion 37.

The exhaust valve and valve seat are provided in the form of a head 42 of the push rod 15 and the edge portion 41 of the through-hole 34 of the valve stem 24, while a spring 25 acts between the partition wall 36 and the push rod 15. The retracting movement of the push rod 15 is restrained by a snap ring 43.

The operation of the control valve shown is similar to those shown in FIGS. 1 and 2. However, in this respect, there may be achieved improved responsiveness for the control valve in reducing the pressure within the actuating chamber 16. Suppose that there is present a certain level of pressure in the actuating chamber 16. More particularly, suppose that the push rod 15 is moved to the left, the exhaust valve (41 and 42) is closed, while the supply valve (9 and 10) is firstly opened to thereby create a pressure in the actuating chamber 16 and then closed again by the leftward movement of the piston 4. Under such a condition, when the force exerted on the push rod 15 is lowered, unlike the cases with FIGS. 1 and 2, the push rod 15 will move to the right, and the exhaust valve will open, whereby the chamber 16 will be in communication with the exhaust passage 21.

This eliminates the hysteresis of input and pressure between the pressure increasing step and the pressure decreasing step. For instance, if it is used for a brake device of an automobile, it presents the advantage in that there is incurred no resistance to the starting action subsequent to the release of the brake pedal.

Figure 6:
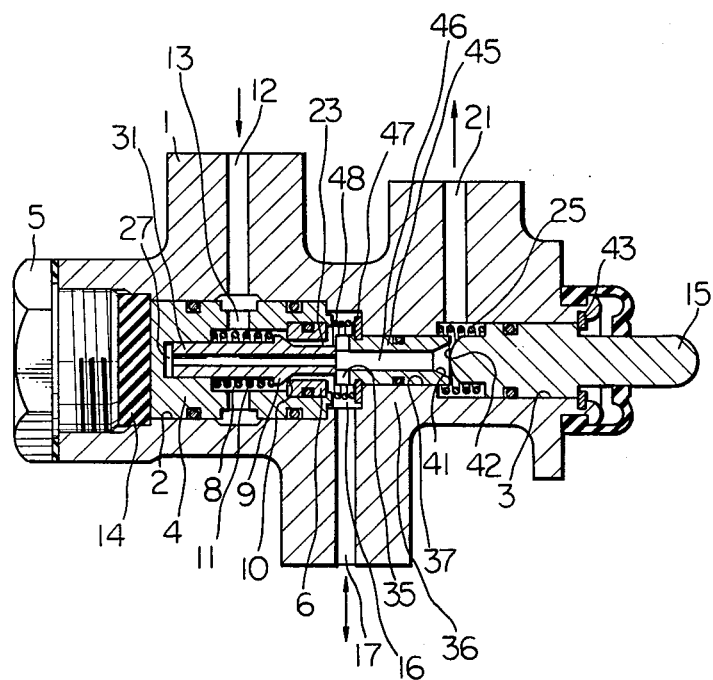
FIG. 6 is a longitudinal cross-sectional view of a fourth embodiment.

FIG. 6 shows a fourth embodiment of the present invention. However, this embodiment is substantially similar to that shown in FIG. 3, and hence only the differences will be described hereinafter.

In FIG. 6, the right hand extension of a supply valve 9, i.e., a valve stem corresponding to valve stem 24, is provided as a separate plunger 45. However, there is provided at the right hand end thereof a valve seat 41 defining an exhaust valve in cooperation with the surface 42 of the push rod, said valve seat 41 being defined in a hole 37 of the plunger 45 slidably and sealingly received in a partition wall 36 of the valve body 1 and having a longitudinally extending through-hole 46 and a radially extending passage 35. The rightward movement of the plunger 45 can be restrained by a retaining ring 47 abutting on the partition wall 36, while there is provided a compression spring 48 between the ring 47 and the piston 4, thereby imparting a biasing force to the plunger to the right.

Referring to the drawing, when the push rod 15 is moved to the left, the exhaust valve (41 and 42) is first closed, and then the plunger 45 is urged, while the supply valve 9 is moved to the left through the plunger 45, then, the valve 9 will be separated from the valve seat 10, thus the pressure fluid from the supply port 23 will flow into the actuating chamber 16, thereby acting on the brake cylinder of the vehicle through the port 17. (See Point A, in FIG. 7.)

When the pressure fluid is supplied into the actuating chamber 16, the plunger 45 will receive the reaction of a magnitude defined by the effective pressure receiving area multiplied by the fluid pressure, and then the piston 4 will move to the left as viewed in the drawing, while compressing the resilient member 14. It follows that due to the relative displacement of the plunger 45 to the piston 4, the valve 9 will again contact the valve seat 10, whereby the supply chamber 8 is blocked from the actuating chamber 16 and thereby the introduction of the pressure fluid to the actuating chamber may be interrupted.

When the push rod 15 is further pushed under a greater force, the supply valve 9 will be opened again through the plunger 45, whereby the pressure fluid will flow from the port 12 into the port 17. Thereafter, the supply chamber 8 is again blocked from the acting chamber 16 due to the movement of the piston 4. In this manner, blocking and communicating operations are repeated, such that the fluid pressure P to the wheel cylinder is gradually increased, reaching the maximum pressure P'.

When an operator releases a brake pedal, the push rod 15 will move to the right as viewed in FIG. 6, and the push rod 15 and plunger 45 will move in integral relation until the retaining ring 47 of the plunger 45 abuts the partition wall 36. During this time, the supply valve 9 remains in the closed condition.

When the retaining ring 47 of the plunger 45 abuts the partition wall 36, only the push rod 15 will move to the right as viewed in the drawing, such that the exhaust valve will be opened, and the port 17 will be brought into communication with the exhaust port 21. (Point B, in FIG. 7.) As a result, the pressure fluid within the wheel cylinder will return to the reservoir connected to the exhaust port 21, and hence the braking action will be released, and the valve returns to its initial condition as shown in the drawing.

Figure 7:
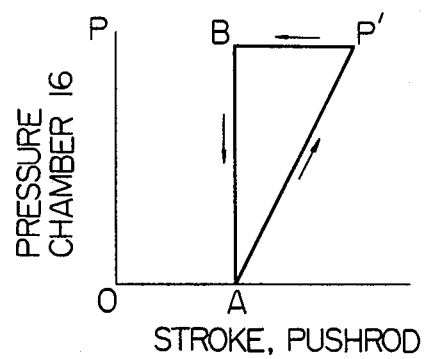
FIG. 7 is a diagram illustrating the relationship of the stroke of a push rod to the pressure.

More particularly, on the return stroke from point P' to point B, the pressure in the wheel cylinder is not released, and the push rod 15 moves backward. During this period, hysteresis is present between the pressure and the stroke. However, the input of the push rod 15 is not reduced until reaching the point B, such that there is no hysteresis between the pressure and the input. (FIG. 7.) According to this embodiment, there is present a hysteresis between the stroke of the push rod 15 and the pressure, with respect to the pressure increasing step and pressure decreasing step, while there is no hysteresis between the input and the pressure. It follows then that the brake releasing operation in an automobile may be carried out smoothly, presenting a high level of safety, while the constant braking force against the input of the push rod may be obtained throughout the advancing and returning strokes, with accompanying good operational feeling.

Figure 5:
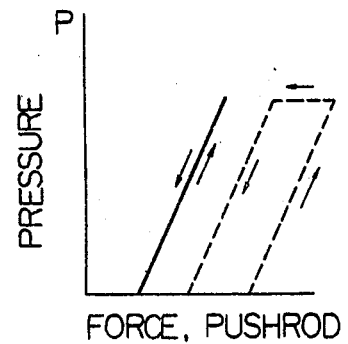
FIG. 5 is a diagram illustrating the relationship of the push rod input to the pressure.

In this case, the relationship of the input of the push rod to the pressure is similar to that shown in FIG. 3 and is shown by the solid line in FIG. 5.

It is apparent that the aforesaid embodiments are shown merely in an illustrative sense, and the various modifications and alterations may be carried out by those skilled in the art within the scope of the appended claims which follow.

What is claimed is:

1. A pressure control valve comprising a housing having therein a bore having a passage extending therefrom for communicating with a source of hydraulic fluid, a control pressure chamber connected to said bore and having a passage extending therefrom for communicating with pressure actuating means, and an exhaust chamber connected to said control pressure chamber and having a passage extending therefrom for communicating with a reservoir of hydraulic fluid, a piston slidably disposed in said bore and a fixed abutment in said bore and elastic means in said bore acting on one end of said piston for urging said piston against said fixed abutment, said piston having a supply pressure space therewithin and a radial opening communicating with said passage to said source of hydraulic fluid, a member in said housing defining an axial opening connecting said supply pressure space to the control pressure chamber, an elongated valve member extending axially of the housing within said supply pressure space and said chambers and having an axial bore extending therethrough and a valve portion on the outer circumference thereof and cooperating with the inner end of said member defining the axial opening from the supply pressure space into the control pressure chamber to form a supply valve, one end of the piston having a blind bore therein in which one end of said valve member is slidably supported, said valve member having an aperture therein opening into said axial bore from said control pressure chamber through which the hydraulic pressure in the control pressure chamber is supplied into the blind bore through the axial bore, and the other end of the valve member being slidable into the exhaust chamber, and a manually operable push rod extending into the exhaust chamber and cooperating with the other end of the valve member to form an exhaust valve between the axial bore and the passage extending from the exhaust chamber to the reservoir for hydraulic fluid.

* * * * *